(12) United States Patent
Soltermann

(10) Patent No.: US 11,898,623 B2
(45) Date of Patent: Feb. 13, 2024

(54) LINEAR DRIVE

(71) Applicant: SKF MOTION TECHNOLOGIES AB, Gothenburg (SE)

(72) Inventor: Marcel Soltermann, St. Pantaleon (CH)

(73) Assignee: SKF Motion Technologies AB, Gothenburg (SE)

( * ) Notice: Subject to any disclaimer, the term of this patent is extended or adjusted under 35 U.S.C. 154(b) by 735 days.

(21) Appl. No.: 16/784,430

(22) Filed: Feb. 7, 2020

(65) Prior Publication Data

US 2020/0284329 A1 Sep. 10, 2020

(30) Foreign Application Priority Data

Mar. 5, 2019 (DE) .......................... 10 2019 105 560

(51) Int. Cl.
*F16H 25/24* (2006.01)
*F16H 25/20* (2006.01)
*B66F 7/06* (2006.01)
*H02K 7/06* (2006.01)

(52) U.S. Cl.
CPC ....... *F16H 25/2454* (2013.01); *B66F 7/0608* (2013.01); *F16H 25/20* (2013.01); *H02K 7/06* (2013.01); *B66F 7/065* (2013.01); *F16H 2025/2081* (2013.01)

(58) Field of Classification Search
CPC ...... A43D 86/00; A43D 25/047; A43D 25/00; B23Q 3/00; B25B 1/2421; B25B 5/003; B25B 5/006; B25B 11/02; F16M 11/08; F16H 25/2454; F16H 2025/2081; B66F 7/0608; B66F 7/065
See application file for complete search history.

(56) References Cited

U.S. PATENT DOCUMENTS

| | | | |
|---|---|---|---|
| 4,257,494 A | 3/1981 | Frankel | |
| 5,295,907 A | 3/1994 | Akkerman | |
| 5,346,045 A * | 9/1994 | Bennett | G09B 9/12 74/89.37 |
| 5,398,780 A | 3/1995 | Althof et al. | |
| 5,809,833 A | 9/1998 | Newport et al. | |
| 5,988,328 A * | 11/1999 | Newport | F16D 59/02 188/186 |

(Continued)

FOREIGN PATENT DOCUMENTS

| CN | 2205871 Y | 8/1995 |
|---|---|---|
| CN | 2334950 Y | 8/1999 |

(Continued)

OTHER PUBLICATIONS

Ewellix Electric Cylinders CASM-100 (Year: 2023).*

(Continued)

*Primary Examiner* — Mahdi H Nejad

(74) *Attorney, Agent, or Firm* — Laurence A. Greenberg; Werner H. Stemer; Ralph E. Locher

(57) ABSTRACT

A linear drive has a linear unit for carrying out a linear movement, a motor for the motorized driving of the linear unit, and a drive connection which extends from the motor as far as the linear unit. In order to ensure reliable operation even in the event of a power failure, it is proposed that the linear drive have a centrifugal brake which is rotationally coupled to the drive connection.

8 Claims, 2 Drawing Sheets

(56) References Cited

U.S. PATENT DOCUMENTS

| | | | |
|---|---|---|---|
| 6,050,365 A | 4/2000 | Newlin | |
| 6,488,260 B1* | 12/2002 | Dietz | F16K 31/047 |
| | | | 464/30 |
| 8,733,508 B2 | 5/2014 | Bacon | |
| 9,677,332 B2 | 6/2017 | Waehrisch et al. | |
| 11,353,075 B2 | 6/2022 | Krause | |
| 11,448,295 B2* | 9/2022 | Eyraud | F16H 25/20 |
| 2002/0170786 A1* | 11/2002 | Bucher | H02K 7/102 |
| | | | 188/185 |
| 2004/0069979 A1* | 4/2004 | Hicks | B66F 7/065 |
| | | | 254/122 |
| 2011/0240409 A1 | 10/2011 | Bacon | |
| 2017/0331350 A1* | 11/2017 | Sørensen | A61G 7/015 |
| 2020/0317494 A1* | 10/2020 | Bafile | B66F 7/0625 |
| 2022/0348449 A1* | 11/2022 | Bafile | F16D 65/186 |
| 2023/0286793 A1* | 9/2023 | Bafile | F16D 59/00 |
| | | | 182/19 |

FOREIGN PATENT DOCUMENTS

| | | | |
|---|---|---|---|
| CN | 102639032 B | * | 11/2015 |
| CN | 105864322 A | | 8/2016 |
| CN | 109989917 A | | 7/2019 |
| CN | 114572911 A | * | 3/2022 |
| DE | 102015106833 A1 | | 11/2016 |
| DE | 102016113117 A1 | | 1/2018 |
| EP | 0551197 A1 | * | 1/1993 |
| JP | H0826620 A | * | 1/1996 |
| JP | H0826620 A | | 1/1996 |

OTHER PUBLICATIONS

EIDE: "Centrifugal Safety Brakes—Type EC/2B5", Technical sheet 6301, https://www.industrialclutch.com/media/catalog/product//e/c/ec-centrifugal-safety-brakes.pdf.

* cited by examiner

LINEAR DRIVE

BACKGROUND OF THE INVENTION

Field of the Invention

The invention relates to a linear drive comprising a linear unit for carrying out a linear movement, a motor for the motorized driving of the linear unit and a drive connection which extends from the motor as far as the linear unit.

A linear drive is a drive system which produces a translational movement. Generally, this movement is a movement in a straight line, that is to say, linearly, but it may also follow another predetermined path.

When a rotary motor is used as a motorized drive, generally an electric motor, the rotational drive movement of the motor is converted into a linear useful movement, as provided, for example, in drives for beds, technical medical devices or industrial applications. For this, a linear drive contains a linear unit which converts the rotational movement of the motor or a gear mechanism which is interposed into a linear movement.

In most cases, the linear unit has a spindle having an outer thread on which a nut is arranged in a rotatable manner relative to the spindle and thereby also in a longitudinally displaceable manner. The translational relative movement of the nut relative to the spindle is then transmitted to a thrust tube which is actively connected to the nut. On the thrust tube or connected to the thrust tube, such linear drives have a connection portion, such as, for example, a fork head, to which a load which is intended to be moved can be secured. The longitudinal movement of the thrust tube is used to move the load.

If a linear drive is used to raise a significant load, the lowering of the load may bring about a large reverse torque on the motor. In order to reduce this, the linear drive may have a brake which converts potential energy of the lowering movement into heat.

Brief Summary of the Invention

An object of the present invention is to provide a linear drive which has a high level of operational reliability.

This object is achieved by a linear drive of the type mentioned in the introduction, which according to the invention has a centrifugal brake which is rotationally coupled to the drive connection.

The invention is based on the consideration that a brake provided has to retain the linear drive which is under load in the event of a failure of the electric motor. Another lowering of the load is in such a case only possible by manually releasing the brake. In the event of manual release of the brake, however, the risk is high that the load may fall very rapidly as a result of the non-self-locking spindle since the linear drive does not sufficiently brake it as a result of the low friction action thereof. Such a lowering may bring about a destruction of the motor and gear mechanism, on the one hand, as a result of extremely high speeds within the linear drive and, on the other hand, also as a result of a sudden stop when the load reaches the ground.

With a centrifugal brake which is rotationally coupled to the drive connection, an undesirable falling of the load can be braked and consequently over-rotation of the linear drive can be prevented. The centrifugal brake can as a result of its braking action limit the speed in the drive connection to a predetermined maximum speed or a maximum speed range which even in the event of a high load is not exceeded. This speed range—the maximum speed in a centrifugal brake is dependent on the drive force acting thereon, even if only to a limited degree—is advantageously adjusted by the construction type of the centrifugal brake in such a manner that the linear drive is guaranteed to withstand a rotation in this speed range without any damage. The linear drive can be protected and the environment can be protected from a load which is lowered down too rapidly.

The linear unit converts in a mechanical manner a rotational movement into a linear movement, and vice versa. For this, it may have a spindle with an outer thread and a threaded nut which rotates thereon and which is arranged so as to be able to be longitudinally displaced relative to the spindle by the rotational movement. Via the drive connection, the linear drive is connected to a rotational motor, for example, an electric motor. The drive connection may contain a gear mechanism which converts a higher motor-side rotational speed into a lower linear-unit-side rotational speed.

Regardless of the location of the arrangement of the centrifugal brake on the drive connection, a rotation of the drive connection brings about a rotation of the centrifugal brake. The centrifugal brake remains brake-free up to a predetermined speed and, when the predetermined speed is exceeded, introduces a braking action whose force action increases as the speed increases.

In order to produce the braking action, the centrifugal brake advantageously comprises at least one friction element which is pressed as a result of the action of centrifugal force above the predetermined speed onto a preferably stationary counter-element and rubs against it so that, as a result of the action of friction, rotational energy is converted into heat. The counter-element is also referred to as a friction element below so that there are provided at least two or more friction elements, which, as a result of the action of centrifugal force above the predetermined speed, are pressed against each other and in this manner absorb energy as a result of the action of friction. To this end, the friction elements are movably supported with respect to each other so that they are moved toward each other as a result of centrifugal forces. For reasons of clarity, only two friction elements are described below without the number of friction elements thereby being limited to two.

In an advantageous embodiment of the invention, the linear drive comprises a gear mechanism in the drive connection. Advantageously, the centrifugal brake is rigidly coupled to the portion of the drive connection arranged between the motor and gear mechanism. Since in this connection region there is generally a higher speed than at the linear element side of the gear mechanism, the centrifugal brake can thereby be more readily activated and sized to be smaller.

A simple and compact embodiment of the linear drive can be achieved if the centrifugal brake is rigidly connected to a motor shaft of the motor.

In order to reliably prevent an unintentional activation of the centrifugal brake, it advantageously contains a spring which retains the friction elements in the open position thereof and counter to the resilient force of which, the friction elements have to be moved into the braking position thereof by the centrifugal forces. In this regard, the spring and the two friction elements are advantageously arranged with respect to each other in such a manner that the friction elements are spaced apart from each other in the idle state and are pressed on each other by means of centrifugal forces of a rotation in a braking manner.

Linear drives may have a motor-controlled brake, for example, an electromechanical brake. The brake is advantageously for braking a falling load or acts as a parking brake. Such a brake has a brake drive, generally an electric drive, and friction elements which are pressed on each other by the brake drive and thus develop their friction effect. When an electromechanical brake is present with friction elements, it is advantageous for the friction elements to also be the friction elements of the centrifugal brake. Friction elements may be saved and the linear drive can be produced in a compact and cost-effective manner.

In the event of a power failure, in order to achieve a reliable braking of the linear drive, it is advantageous for the electromechanical brake to contain a spring and a brake drive and to be constructed in such a manner that the spring presses the friction elements in a powerless state of the brake drive into their braking position. Alternatively or additionally to the spring, there may be provided a permanent magnet which presses the friction elements in a powerless state of the brake drive into the braking position thereof. For reasons of clarity, only a spring will be referred to below, wherein the magnet is hereby intended to be included as an alternative thereto.

Depending on the embodiment of the spring, the friction elements may also be pulled into their braking position, wherein the terms pulling and pressing in this instance for reasons of simplicity can be used as synonyms in order to describe the spring, regardless of the active direction thereof.

Advantageously, the friction elements of the electromechanical brake are radial friction elements, they are thus moved by means of an outward radial movement into the braking position thereof and moved by means of an inward radial movement away from it. In such an embodiment, the friction elements can be activated in a particularly simple manner by means of centrifugal forces and can act as friction elements of the centrifugal brake. It is thus advantageous for at least one of the friction elements to be radially movable in the release position thereof so that, as a result of centrifugal forces above a threshold value, it is pressed in a braking manner on the other friction element.

In the case of a dual function of the friction elements as friction elements of the additional brake and the centrifugal brake, two—there may of course also be more—mutually counteracting springs are advantageously provided. A brake spring presses or pulls the friction elements when the brake drive is in the powerless state into the braking position thereof and a release spring presses or pulls the brake elements into their release position. In this instance, the springs are advantageously adjusted in such a manner that the brake spring overrides the release spring so that the friction elements in the idle and powerless state of the brake drive are reliably pressed into their braking position.

Regardless of an action of the brake drive, the centrifugal brake should be configured in such a manner that it brakes when the predetermined speed is reached. This can be achieved when at least one of the friction elements is radially movable in the release position thereof so that, as a result of centrifugal forces above a threshold value, it is pressed in a braking manner on the other friction element.

In order to release the electromechanical brake, an alternative drive may be provided, for example, a manual drive, such as a mechanical lever which can be operated by an operator. Even in the powerless state of the brake, the brake can be released and the linear drive can be moved. In order in this instance to keep the centrifugal brake active, it is advantageous for at least one of the friction elements to be radially movable in the release position thereof. In spite of the actuation of the alternative drive, the friction element can be moved by means of centrifugal force into the braking position thereof and can brake the linear drive.

The invention can be used in a particularly advantageous manner on a scissor lift having a linear drive as described above. It can also advantageously be used with a mobile working platform, a forklift truck wire rope, a scissor table or an excavator. Only the scissor lift will be mentioned by way of example below, but can alternatively be replaced by the other devices mentioned.

In order to raise and lower the scissor lift, the linear drive activates the scissor lift generally via a large lever so that a smaller movement of the linear drive leads to a larger movement of the scissor lift. When a scissor lift is lowered, significant forces thus act on the linear drive as a result of translation. In order to prevent excessively rapid rotation of the linear drive, the centrifugal brake according to the invention is particularly advantageous.

The invention further relates to a method for braking a linear drive, wherein an external, in particular linear force acts on a linear unit of the linear drive, this linear unit converts the force into a rotation and the rotation is at least partially transmitted to a motor by means of a drive connection.

In order to ensure reliable operation of the linear drive, it is proposed that the rotation activate a centrifugal brake which limits the rotation to a predetermined speed range. The centrifugal brake may when reaching the speed range initiate a braking operation which ensures that even the maximum speed reached remains in the predetermined speed range since the braking force increases as the speed increases and counteracts a further increase of the speed.

The above description of advantageous embodiments of the invention contains numerous features which are set out combined together in a few dependent claims. However, these features can advantageously also be considered individually and combined to form other advantageous combinations, in particular in claim dependencies, so that an individual feature of a dependent claim can be combined with a single, a plurality of or all of the features of another dependent claim. Furthermore, these features can be combined individually and in any suitable combination both with the method according to the invention and with the device according to the invention according to the independent claims. Thus, method features should also be considered to be worded objectively as a property of the corresponding device unit and functional device features should also be considered to be corresponding method features.

The above-described properties, features and advantages of this invention and the manner in which they are achieved will become clearer and more readily understandable together with the following description of the embodiments which are explained in greater detail in connection with the drawings. The embodiments serve to explain the invention and do not limit the invention to the combination of features set out therein, not even with regard to functional features. Furthermore, suitable features of any embodiment may also be considered explicitly in isolation and combined with any one of the claims.

DESCRIPTION OF THE INVENTION

Figure 1:
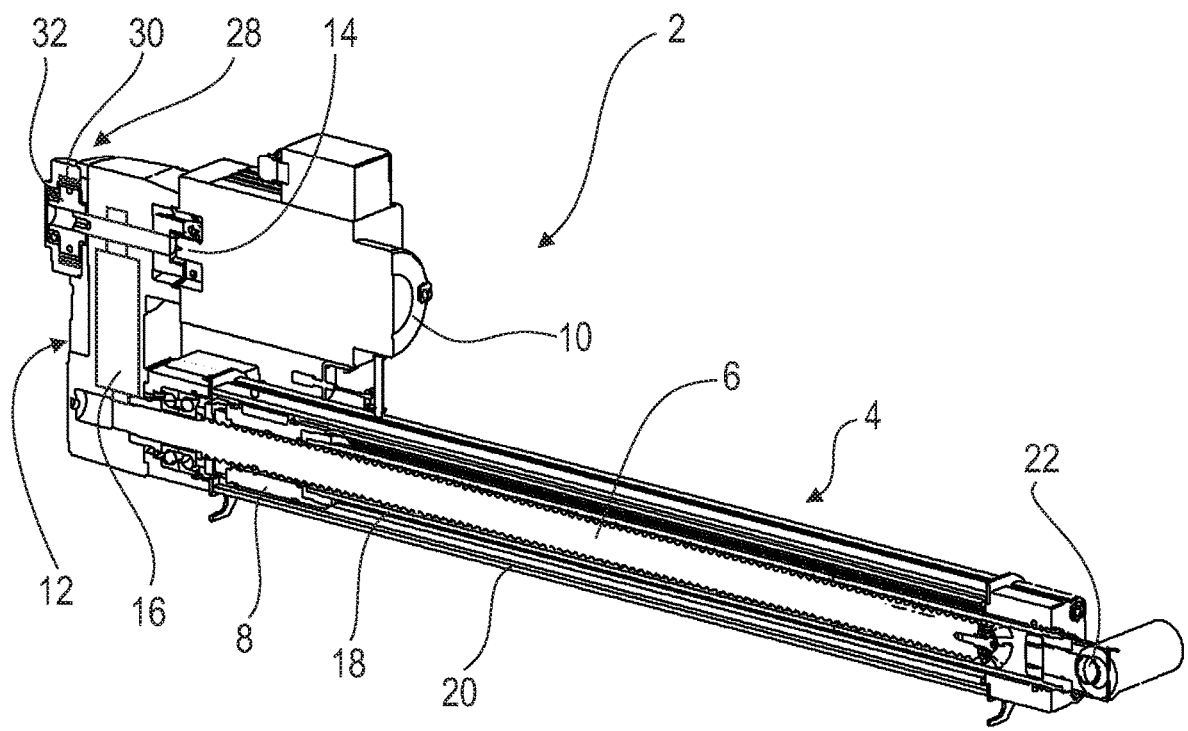
FIG. 1 shows a linear drive comprising a linear unit having a spindle, a motor and a drive connection between the motor and linear unit having a gear mechanism and a centrifugal brake.

FIG. 1 shows a linear drive 2 having a linear unit 4, which has a spindle 6 with an outer thread and a threaded nut 8 which has an inner thread and which runs on the spindle 6. The linear unit 4 is driven by means of a motor 10 in the form of an electric motor which is illustrated only schematically in FIG. 1. The motor 10 and linear unit 4 are connected to each other by means of a drive connection 12. The drive connection 12 extends from the motor shaft 14 via a gear mechanism 16 which is also illustrated only schematically in FIG. 1 as far as the spindle 6 of the linear unit 4 so that the motor 10 drives the spindle 6 via the gear mechanism 16. The gear mechanism 16 in this instance converts a higher speed of the motor 10 into a lower speed of the spindle 6.

The threaded nut 8 is connected to a thrust pipe 18 and connected to a covering pipe 20 in a rotationally secure manner or supported in some other rotationally secure manner, for example, on a table via a fork head or articulated head 22. In the event of a rotational movement of the spindle 6, the threaded nut 8 therefore carries out a linear movement or a translational movement along the covering pipe 20 so that the thrust pipe 18 can be moved in and out of the covering pipe 20. Both the spindle 6 and the threaded nut 8 are arranged concentrically relative to the longitudinal movement axis of the linear unit 4 which is also the rotation axis of the spindle 6. The longitudinal movement of the thrust pipe 18 is carried out as a result of the rotational movement of the spindle 6 which is converted into a translational movement of the threaded nut 8.

At the front end of the thrust pipe 18 there is fixed an articulated head 22, by means of which the linear drive 2 can be connected in a positive-locking manner to a system which is intended to be moved. Such a system may be a patient's bed, an operating table, a lifter or another arrangement. The use on a scissor lift 24 which is illustrated schematically in FIG. 2 is described below by way of example.

Figure 2:
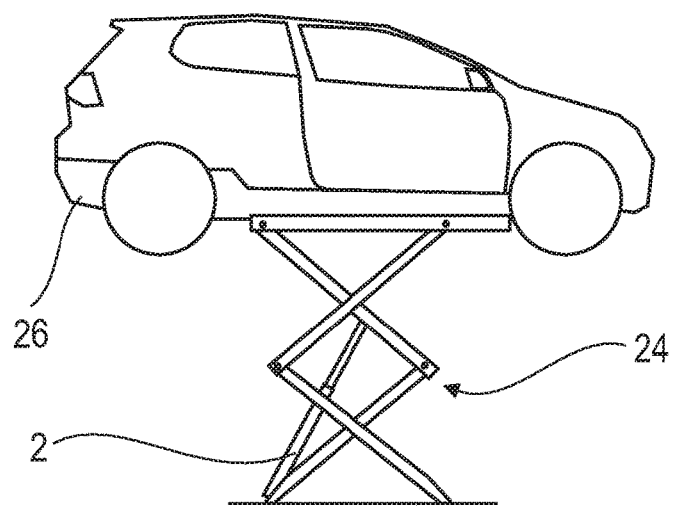
FIG. 2 shows a scissor lift having a linear drive.

FIG. 2 is a schematic side view of a scissor lift 24 which carries a load 26, in this embodiment a car. The scissor lift 24 can be raised or lowered by means of the linear drive 2 which is also indicated only schematically in this Figure. For lifting, the thrust pipe 18 is moved out of the covering pipe 20 and it is retracted again in order to lower the load 26.

When the scissor lift 24 is raised and lowered, the construction type of the scissor lift 24 results in a translation of the linear movement of the linear drive 2 into raising or lowering of the load 26 or the scissor lift 24. A smaller linear movement of the linear drive 2 is converted into a larger lifting or lowering movement of the scissor lift 24. As a result of this translation and also the fact that a scissor lift 24 under some circumstances carries a very large load 26, the force with which the scissor lift 24 presses on the linear drive 2 is great. In the case of a non-self-locking threaded connection between the spindle 6 and threaded nut 8, the torque which the scissor lift 24 or the load 26 applies to the motor 10 is also great.

It is therefore problematic when the motor 10 fails, for example, as a result of a defect in the power supply. The counter-force produced by the motor 10 fails, the scissor table 24 collapses and the load 26 falls down. In order also to retain the scissor lift 24 in the powerless state of the motor, the linear drive 2 comprises a brake system 28 having a motor-releasable brake 30. The brake 30 is constructed in such a manner that it is in the braking state thereof in the powerless state. Friction elements of the brake 30 are pressed against each other and block a rotation of the motor 10 and consequently also the spindle 6. In the event of a power failure or other defect, therefore, a retraction of the thrust pipe 18 into the covering pipe 20 brought about by external pressure is blocked.

In the event of such a safety blockage, it may also be advantageous to lower the scissor lift 24 in order to retrieve the load 26 from the scissor lift 24. In this instance, an electromechanical release of the brake 30 and an operation of the motor 10 are not possible where applicable as a result of a failure of the power supply. In order to be able to manually control this state, the brake 30 comprises a manual drive by means of which the brake 30 can be released. An operator operates this manual drive and the thrust pipe 18 can—in a manner driven by the load 26—be retracted into the covering pipe 20.

In this instance, however, there is the problem that the linear drive 2 counteracts a lowering of the scissor lift 24 or the load 26 with only a small counter-force and the load 26 is lowered with only little braking. Although the manual drive of the brake 30 may be constructed in such a manner that the brake 30 can only be slightly released manually so that the retraction of the thrust pipe 18 is braked, there is still the risk of the load 26 falling down in the event of an operator error, which should be avoided.

In order to solve this problem, the brake system 28 comprises a centrifugal brake 32. This brake is necessarily coupled to the rotation of the drive connection 12, in the embodiment shown rigidly to the motor shaft 14. A retraction of the thrust pipe 18 into the covering pipe 20 as a result of pressure therefore necessarily leads to a rotation of the centrifugal brake 32. If a predetermined speed range of the centrifugal brake 32 is reached, the centrifugal brake 32 activates a braking operation and keeps the rotation speed of the drive connection 12, in this instance of the motor shaft 14, in a predetermined speed range irrespective of the load. To this end, the centrifugal brake 32 comprises friction elements 34 (FIG. 2) which are activated by means of rotation.

Figure 3:
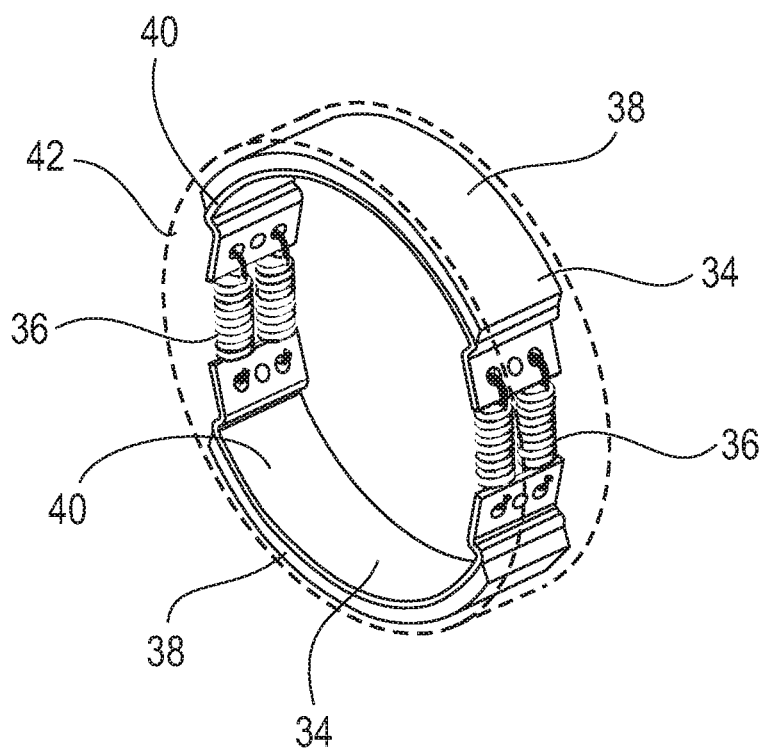
FIG. 3 shows two friction elements of the centrifugal brake which are coupled by means of springs.

FIG. 3 is a perspective view of two such friction elements 34. The friction elements 34 are connected to each other by means of resilient elements 36 with one or more springs respectively. FIG. 3 shows the resilient elements 36 in the relaxed state or a pretensioned state and the friction elements 34 in their release state in which the centrifugal brake 32 has no braking action. The friction elements 34 each contain a brake liner 38 on a caliper 40 which is rigidly connected by means of a connection which is not illustrated to the drive connection 12, in this instance the motor shaft 14.

When the drive connection 12 rotates, the friction elements 34 also rotate and pull the resilient elements 36 apart as a result of centrifugal force. The friction elements 34 are pressed radially outward and contact when the predetermined speed range is reached a brake drum 42 which is illustrated with dashed lines and only schematically in FIG. 3. The brake drum 42 can also be understood to be friction elements 42. The interaction of the friction elements 34, 42 produces a braking force which increases as the speed of the centrifugal brake 32 increases and consequently keeps the rotation of the centrifugal brake 32 in the predetermined speed range. The predetermined speed range is not exceeded and the load 26 is also lowered at a desired speed in the powerless state of the linear drive 2 and when the motorized brake 30 is completely released.

Figure 4:
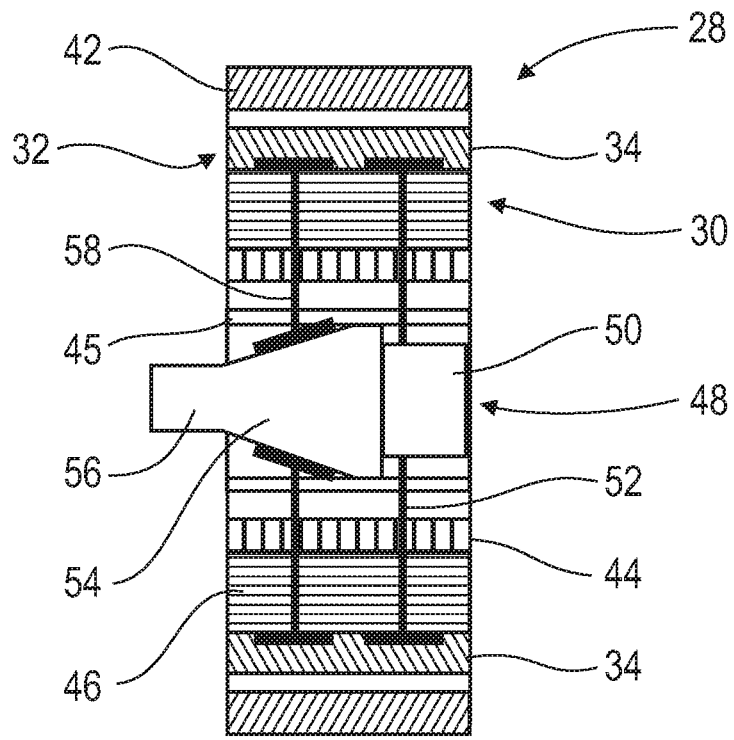
FIG. 4 is a schematic section through the centrifugal brake.

FIG. 4 is a schematic cross-section through the brake system 28 with the electromechanical brake 30 and the centrifugal brake 32. There is illustrated the brake drum 42 which is secured to the outer housing, the rotation-free friction elements 34 and a caliper 44 which is rigidly connected to the motor shaft 45 which is illustrated only schematically in FIG. 4. Between the caliper 44 and friction elements 34, there is provided a spring 46 whose resilient force is directed radially outward. In the powerless state of the brake system 28, the spring 46 presses the friction elements 34 against the friction element 42 or the brake drum 42 and thus blocks a rotation of the motor shaft 14 or the drive connection 12.

Via a motorized drive 48 having an electric motor 50 and a mechanism 52 which is illustrated only schematically, the spring 46 can be tensioned inward in a radial direction and the friction elements 34 can be released from the outer friction element 42. This state is illustrated in FIG. 4. The centrifugal brake 32 is in the release position thereof and the linear drive 2 can operate in a regular manner. Since the motorized drive 48 releases the spring 46 in the powerless state so that the brake 30 blocks, an alternative and manual drive 54 having, for example, a lever 56 is provided and is also illustrated only schematically in FIG. 4. Using this alternative drive 54 and another mechanism 58, the spring 46 can be tensioned by manual operation and the brake 30 can be released.

If, in this released state, the rotatable portion of the brake system 28 is caused to carry out a rotational movement, the friction elements 34 are subjected to the centrifugal force, which pulls them radially outward. As described in relation to FIG. 3, in such a state the friction elements 34 operate counter to the resilient elements 36 and move radially outward in order when the predetermined speed range is reached to initiate a braking of the centrifugal brake 32. To this end, the friction elements 34 are arranged so as to be able to be radially released from the caliper 44 and/or the spring 46 so that, as a result of centrifugal force, they move closer to the outer friction element 42 and initiate the braking operation. The resilient elements 36 counteract this radial centrifugal movement and press the friction elements 34 in the idle state of the centrifugal brake 32 radially inward counter to the spring 46, the caliper 44 or another retention element which is not illustrated.

The friction elements 34 are friction elements 34 both of the centrifugal brake 32 and of the motorized brake 30. A dual function is therefore associated with them and, in a state driven by a spring and driven by centrifugal force, they can activate the braking action of the brake 30 or the centrifugal brake 32. The linear drive 2 can thereby also be blocked in an operationally reliable manner in the powerless state and retracted in an operationally reliable manner so that with the linear drive 2 a system which is intended to be moved, such as, for example, the scissor lift 24, can always be operated in a reliable manner.

LIST OF REFERENCE NUMERALS

2 Linear drive
4 Linear unit
6 Spindle
8 Threaded nut
10 Motor
12 Drive connection
14 Motor shaft
16 Gear mechanism
18 Thrust pipe
20 Covering pipe
22 Articulated head
24 Scissor lift
26 Load
28 Brake system
30 Brake
32 Centrifugal brake
34 Friction element
36 Resilient element
38 Brake liner
40 Caliper
42 Brake drum
44 Caliper
45 Motor shaft
46 Spring
48 Electromechanical drive
50 Electric motor
52 Mechanism
54 Drive
56 Lever
58 Mechanism

The invention claimed is:

1. A linear drive, comprising:
a linear unit for carrying out a linear movement;
a motor for a motorized driving of said linear unit, said motor having a motor shaft;
a drive connection extending from said motor as far as said linear unit;
a gear mechanism disposed in said drive connection; and
a centrifugal brake rotationally coupled to said drive connection and being rigidly and permanently connected to said motor shaft, said centrifugal brake configured to limit a speed in said drive connection to a predetermined maximum speed or a maximum speed range, and said centrifugal brake being rigidly coupled to a portion of said drive connection disposed between said motor and said gear mechanism.

2. The linear drive according to claim 1, further comprising a motorized brake containing friction elements, and said friction elements are also friction elements of said centrifugal brake.

3. The linear drive according to claim 2, wherein said motorized brake contains a spring and a brake drive and is constructed in such a manner that said spring presses said friction elements into a braking position in a powerless state of said brake drive.

4. The linear drive according to claim 3, further comprising an alternative drive, wherein said friction elements in a powerless state of said brake drive can be moved by means of said alternative drive into a release position, wherein at least one of said friction elements is radially movable in the release position.

5. The linear drive according to claim 2, wherein at least one of said friction elements is radially movable in a release position thereof so that, as a result of centrifugal forces above a threshold value, said at least one friction element is pressed in a braking manner on another one of said friction elements.

6. A linear drive, comprising:
a linear unit for carrying out a linear movement;
a motor for a motorized driving of said linear unit, said motor having a motor shaft;
a drive connection extending from said motor as far as said linear unit; and a centrifugal brake rotationally coupled to said drive connection and being rigidly and permanently connected to said motor shaft, said centrifugal brake configured to limit a speed in said drive connection to a predetermined maximum speed or a maximum speed range;

said centrifugal brake having at least one spring and at least two friction elements, being disposed with respect to each other in such a manner as to cause said at least two friction elements to be spaced apart from each other in an idle state and to be pressed on each other by centrifugal forces upon a rotation in a braking manner.

7. The linear drive according to claim 6, wherein said at least two friction elements may assume a release position and are retained in the release position by said at least one spring.

8. A scissor lift, comprising:

a linear drive containing a linear unit for carrying out a linear movement, a motor for a motorized driving of said linear unit, said motor having a motor shaft, a drive connection extending from said motor as far as said linear unit, a gear mechanism disposed in said drive connection, and a centrifugal brake rotationally coupled to said drive connection and being rigidly and permanently to said motor shaft, said centrifugal brake configured to limit a speed in said drive connection to a predetermined maximum speed or a maximum speed range, and said centrifugal brake being rigidly coupled to a portion of said drive connection disposed between said motor and said gear mechanism.

\* \* \* \* \*